No. 751,692. PATENTED FEB. 9, 1904.
C. H. SEMM.
VEHICLE COUPLING.
APPLICATION FILED NOV. 14, 1903.
NO MODEL.

Witnesses,
R. C. Matiff
H. D. Kilgore

Inventor,
Charles H. Semm,
By his Attorneys,
Williamson & Merchant

No. 751,692. Patented February 9, 1904.

UNITED STATES PATENT OFFICE.

CHARLES HENRY SEMM, OF CARRVILLE, IOWA, ASSIGNOR OF TWO-THIRDS TO GEORGE W. WHITWORTH, OF CEDAR FALLS, IOWA.

VEHICLE-COUPLING.

SPECIFICATION forming part of Letters Patent No. 751,692, dated February 9, 1904.

Application filed November 14, 1903. Serial No. 181,116. (No model.)

*To all whom it may concern:*

Be it known that I, CHARLES HENRY SEMM, a citizen of the United States, residing at Carrville, in the county of Floyd and State of Iowa, have invented certain new and useful Improvements in Vehicle-Couplings; and I do hereby declare the following to be a full, clear, and exact description of the invention, such as will enable others skilled in the art to which it appertains to make and use the same.

My invention has for its object to provide an improved coupler adapted for coupling together vehicles of various characters, but is especially adapted for connecting a separator, stacker, tender, or other farm implement to a traction-engine.

To the above ends the invention consists of the novel devices and combinations of devices hereinafter described, and defined in the claims.

The invention is illustrated in the accompanying drawings, wherein like characters indicate like parts throughout the several views.

Figure 1:
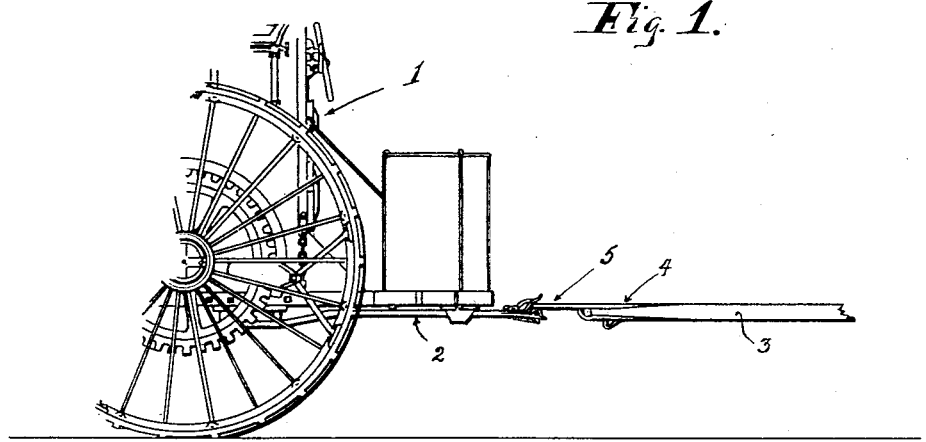
Figure 2:
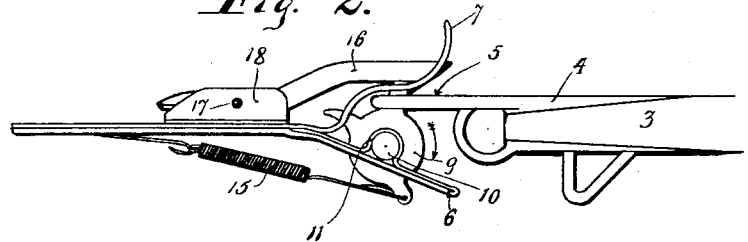
Figure 3:
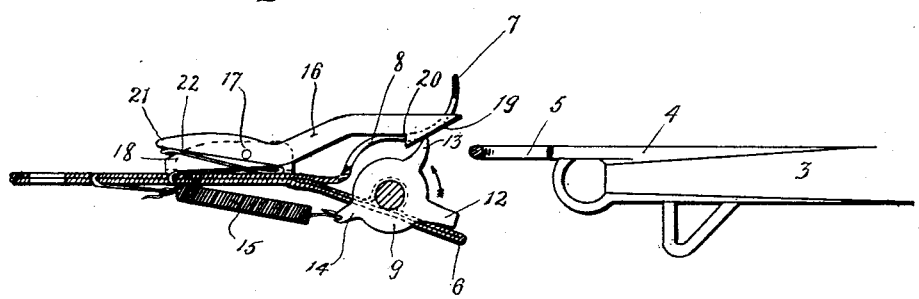

Figure 1 is a view in side elevation showing the rear portion of a traction-engine and the pole of a vehicle coupled thereto by my improved coupler. Fig. 2 is a view in side elevation showing the improved coupler on an enlarged scale and showing a portion of the pole coupled thereto; and Fig. 3 is a view corresponding somewhat to Fig. 2, but with some parts sectioned and with the pole detached from the coupler.

The numeral 1 indicates an ordinary traction-engine, the rear portion only of which is shown, the said engine having the usual draft-bar 2, to the rear end of which in the present instance my improved coupler is applied.

The numeral 3 indicates the pole of a vehicle which is to be attached to the engine, which pole is provided with a forwardly-projecting metallic strap 4, having a vertical eye or perforation 5.

For the application of my improved coupler to the engine it is advisable to bifurcate the rear portion of the draft-bar 2, so that it is formed with a downwardly-inclined supporting-arm 6 and an overlying guard-arm 7, which guard-arm has a long slot 8 and is bent on the line of a compound curve. A hub-like lock-dog 9, having laterally-projecting trunnions 10, mounted in bearings 11 on the bar-arm 6, is provided with a radially-projecting lock-lug 12, a push-lug 13, and an ear 14. A coiled spring 15 is attached to the ear 14 and to the draft-bar 2 and tends to hold the lock-dog 9 in the position shown in Fig. 3, with its lock-lug 12 engaging the arms 6 as a stop and with its push-arm 13 projecting upward and forward just below the upwardly-curved portion of the guard-arm 7 in position to be engaged by the forward end of the perforated pole-strap 4.

A lock-pawl 16 is pivoted at 17 to vertical flanges 18 of the draft-bar 2, with its rear end working through the slot 8 of the guard-arm 7. The said projecting rear end of the lock-pawl 16 is beveled at 19 and formed with a lock-shoulder 20. The forwardly-projecting end 21 of the said lock-pawl 16 affords a foot-piece which when stepped upon or depressed raises the hook or beveled end of the said pawl. A spring 22, anchored upon the draft-bar 2 and pressing upon the foot-piece 21, tends to hold the lock-pawl in the position indicated in Fig. 3, in which position, as shown, the folded portion of the spring 22 affords a stop to limit the downward movement of the rear end of the said pawl.

In the position of the parts shown in Fig. 3 it will be noted that the beveled and shouldered portions 19 of the said pawl 16 project through and below the slot 8 of the guard-arm 7, and it will be further noted that the lower portion of said guard-arm follows a curve which corresponds approximately to the arc described by the outer end of the push-lug 13.

The manner of coupling is as follows: Either by backing the engine onto the pole 3 or by drawing the pole forward the forward end of the pole-strap 4 is thrust against the push-lug 13 of the lock-dog 9, and the lock-dog 9 is thereby rotated in the direction indicated by the arrow marked on Fig. 3 until the lock-lug 12 engages the cam-surface 19, lifts the rear end of the lock-pawl 16, and then passes forward of its lock-shoulder 20, whereupon the said lock-dog is locked and held by the lock-pawl 16 in the position shown in Fig. 2. As the lock-lug 12 moved upward and forward, as just described, it passed through the perforations 5 of the pole-strap 4, and hence, of course, coupled the pole to the draft-bar 2 or other device to which the coupler is attached.

To uncouple the pole from the draft-bar, it is only necessary to step upon the foot-piece 21 of the lock-pawl 16, and thereby release the lock-lug 12 of the lock-dog 9 from the lock-shoulder 20 of the said pawl, whereupon the spring 15 will throw the lock-lug 12 rearward of the lock-shoulder 20, and hence uncouple the pole.

With the coupling above described it is evident that the pole may be coupled in almost any position—that is, the pole may stand at an angle to the draft-bar, either upward, downward, or in a horizontal plane and may be coupled in any position in which the perforated end of the pole-strap 4 may be forced against the rear face of the push-lug 13. It is also evident that the coupling is of small cost and has few parts to get out of order. It will also be understood that the device described is capable of modification within the scope of my invention as herein set forth and claimed. It will be further understood that the coupling is not limited to any particular application, but is capable of general use for coupling one vehicle to another which is to be drawn thereby regardless of the character of such vehicles.

What I claim, and desire to secure by Letters Patent of the United States, is as follows:

1. In a coupler of the character described, the combination with a pivoted lock-dog having a lock-lug and a push-lug, of a spring tending to throw said lock-dog into an unlocking position, and a lock-pawl having a lock-shoulder engageable with said lock-lug to hold said lock-dog in a coupling position, against the tension of its spring, substantially as described.

2. In a coupler of the character described, the combination with a pivoted lock-dog having a lock-lug and a push-lug, of a guard-arm overlying said lock-dog and coöperating with said lock-lug to hold the coupled part, and a spring-pressed lock-pawl having a foot-piece at one end and having at its other end a lock-shoulder that engages said lock-lug, to hold said lock-dog in a locking position, substantially as described.

3. The combination with a draft-bar, or similar part, having the supporting-arm 6 and the overlying curved guard-arm 7 with slot 8, of the lock-dog 9 pivoted to said arm 6 and provided with the lock-lug 12 and push-lug 13, the spring 15 tending to hold said lock-dog in an unlocking position, and the spring-pressed lock-pawl 16 pivoted to said draft-bar provided at its forward end with a foot-piece, and at its rear end beveled at 19 and having the lock-shoulder 20, for coöperation with the lock-lug 12 of said lock-dog, substantially as described.

In testimony whereof I affix my signature in presence of two witnesses.

CHARLES HENRY SEMM.

Witnesses:
F. B. MILLER,
H. S. INGLETHRON.